May 26, 1925.
L. C. McELWEE
TRANSMISSION CASE
Filed May 31, 1923
1,539,755
2 Sheets-Sheet 1
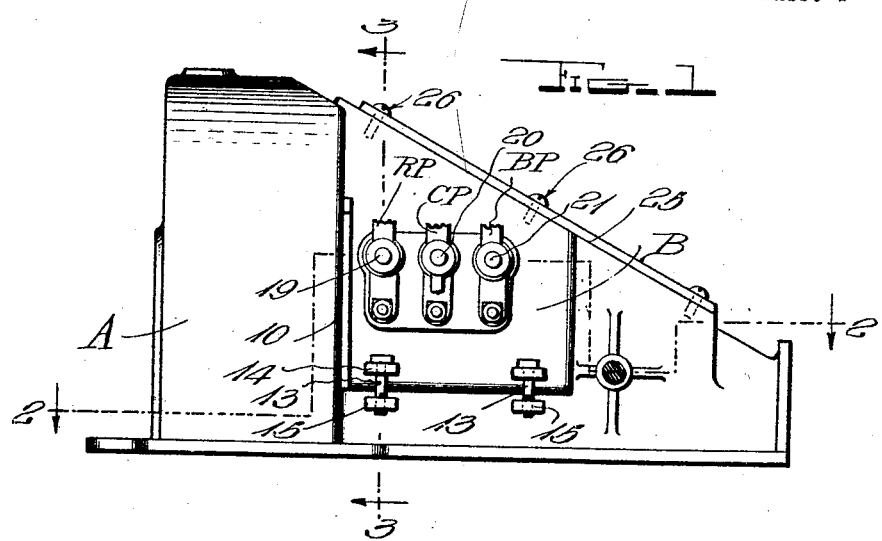
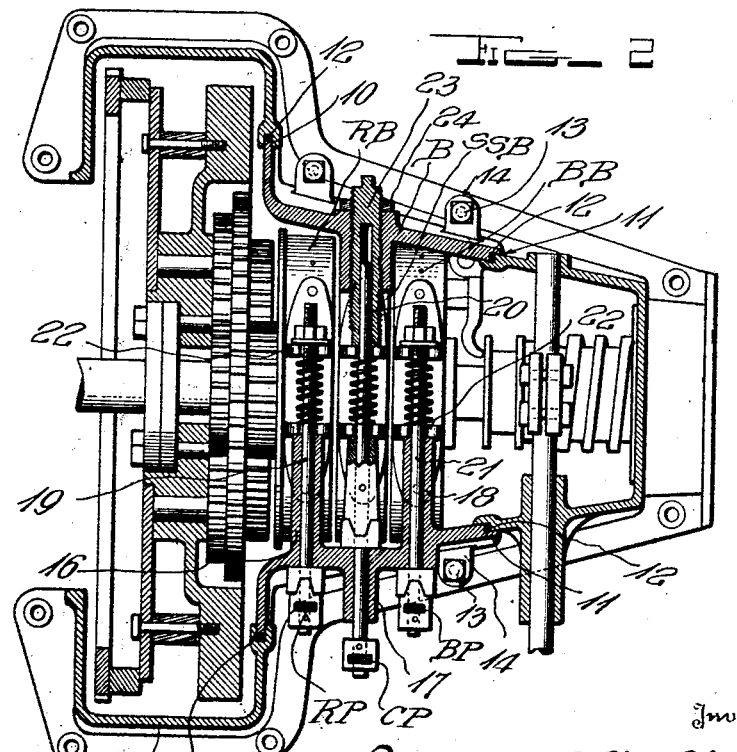
Inventor
Lawrence C. McElwee
By L. L. Morrill
Attorney May 26, 1925.

L. C. McELWEE

TRANSMISSION CASE

Filed May 31, 1923

Inventor

Lawrence C. McElwee

By L. L. Morrill

Attorney

Patented May 26, 1925.

1,539,755

UNITED STATES PATENT OFFICE.

LAWRENCE C. McELWEE, OF HOT SPRINGS, VIRGINIA.

TRANSMISSION CASE.

Application filed May 31, 1923. Serial No. 642,604.

*To all whom it may concern:*

Be it known that I, LAWRENCE C. McEL-WEE, a citizen of the United States, residing at Hot Springs, in the county of Bath and State of Virginia, have invented certain new and useful Improvements in Transmission Cases, of which the following is a specification.

This invention relates to transmission cases for band type of transmission and has for an object to provide means whereby access to the transmission case for various purposes as, for instance, relining the transmission bands may be more readily and conveniently attained.

A further object of the invention is to provide a transmission casing having a sectional part removable from the main body of the casing, said sectional removable part taking with it the several levers for reverse, clutch and brake operating mechanism from the bands within the casing, whereby the bands are free and may be easily reached from both sides for the purposes mentioned.

A further object of the invention is to provide an improved type of transmission casing which provides access upon the top and both sides of the several bands within the casing, making the manipulation of the bands for the purposes mentioned convenient and easy.

With these and other objects in view, the invention comprises certain novel parts, elements, units, combinations, constructions, interactions, functions, mechanical movements and connections as disclosed in the drawings, together with mechanical and functional equivalents thereof, as will be hereinafter more fully described and claimed.

In the drawings:

Figure 1 is a view in side elevation of a crank casing embodying the present invention, the several pedal arms being broken away.

Figure 2 is a sectional view taken on line 2—2 of Figure 1, showing the internal construction of the transmission mechanism largely in top plan and the casing in horizontal section.

Like characters of reference indicate corresponding parts throughout the several views.

Figure 3:
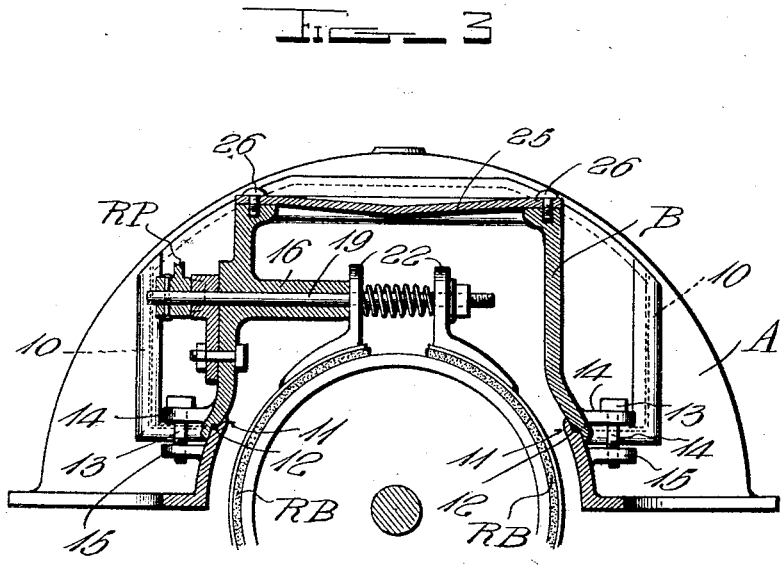
Figure 3 is a vertical sectional view taken on line 3—3 of Figure 1, showing the casing in section and the manner of joining and connecting the removable panel.
Figure 4:
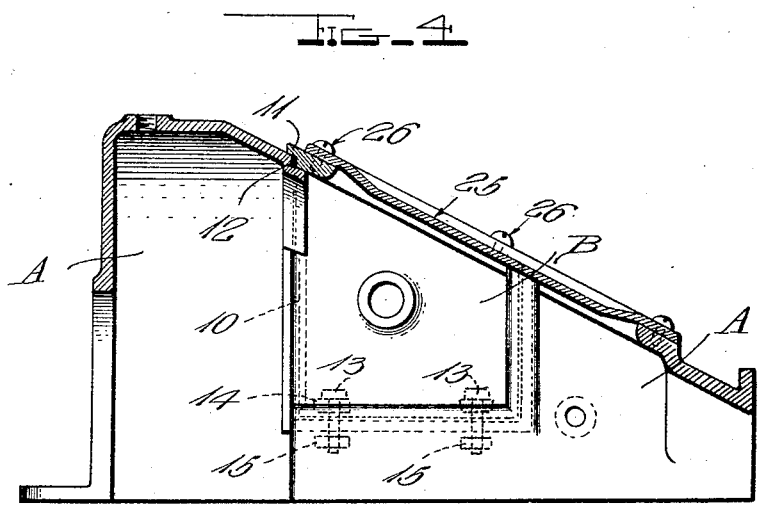
Figure 4 is a longitudinal sectional view through the casing only, all contained parts being omitted.

The transmission casing which forms the subject-matter of this application in its general shape, contour and design, is the usual and ordinary transmission case ordinarily found upon transmissions of the band type and is indicated as an entirety at A. The transmission casing contains the usual and ordinary transmission mechanism as, for instance, the reverse band RB, the slow speed band, SSB and the brake band BB. These several bands are respectively controlled in the usual manner by the reverse pedal RP, the clutch pedal CP, and the brake pedal BP. So far, the device does not differ from similar devices already well known.

Wherein the present device differs from the usual practice is that instead of making the transmission casing as an integral indivisible unit it comprises a removable panel B. This removable panel continues the design and contour of the transmission casing in the usual manner but is removable therefrom and connected therewith by means of a tongue and groove connection at 10 and with lap joints throughout the remaining portion, 11. Preferably these lap joints will be provided with packing strips or gaskets, 12, whereby oil-tight joints are assured, and the panel is secured in position in any approved manner, as by the means of screws, 13, inserted through ears, 14, of the panel and screwed into complementary ears, 15, the said ears, 14 and 15, being preferably cast integral, respectively, with the panel B and the main casing, A.

The panel, B, is provided with sleeves, 16, 17 and 18, journaling, respectively, the tension rods 19, 20 and 21 of the reverse pedal, the clutch pedal and the brake pedal. Each of the several bands is provided with upstanding bifurcated ears, 22, so that the several tension rods, 19, 20 and 21, may be lifted out of the ears with the lifting of the panel. As is customary in this construction, the tension rod, 20, is seated in an adjusting sleeve, 23, also carried by the panel and locked by the usual lock nut, 24, so that the entire structure for controlling the several bands is lifted bodily as an organized structure from its controlling engagement with the several bands when the panel is removed, leaving all of said bands freely accessible from both sides and the top, removing, as will be noted, all of the obstructing structure and making all of said bands conveniently available. The closure plate, 25, is of the usual and ordinary construction and is secured both to the main casing, A, and the panel, B, by the usual means as, for instance, the screws, 26. In replacing the panel, therefore, the closure, 25, being removed, access is had to the interior of the housing for the purpose of bringing the organization back into operative relation in the usual manner, so that the panel is replaceable with the minimum labor.

By the use of this removable panel and its associated parts, the labor of relining bands or performing other labor within the casing is reduced to a minimum. Also, it will be apparent that by the use of the screws, 13, or their equivalent fastening means, the panel may be so tensioned as to make a complete and efficient oil-retaining joint.

I claim:

1. A transmission casing for band transmission embodying pedals for the control of said bands and comprising a panel removable from said casing and closing an opening in said casing over the top of and down both sides of said bands, said panel having sliding engagement with the casing, serving as a guide for the proper assembly of the parts.

2. A transmission casing for band transmission embodying levers for actuating said bands and tension rods controlled by said levers and extending into said casing, comprising a panel journaling said rods and removable from the casing, exposing for access the tops and both sides of said bands unobstructed by actuating mechanism, said panel having sliding engagement with the casing, serving as a guide for the proper assembly of the parts.

3. A transmission casing for band transmission provided with an opening extending over the top of and down both sides of said band structures, a panel proportioned to close the opening and provided with oil-retaining marginal joints and journals carried by the panel proportioned to journal band actuating tension rods, said panel having sliding engagement with the casing, serving as a guide for the proper assembly of the parts.

4. A transmission casing for band transmission provided with an opening extending over the top of and down both sides of the band structure and an integral panel proportioned to close said opening, said panel having sliding engagement with the casing, serving as a guide for the proper assembly of the parts.

In testimony whereof I affix my signature.

LAWRENCE C. McELWEE.